SYNCHRONIZATION OF CODE SYSTEMS
Filed Nov. 20, 1967
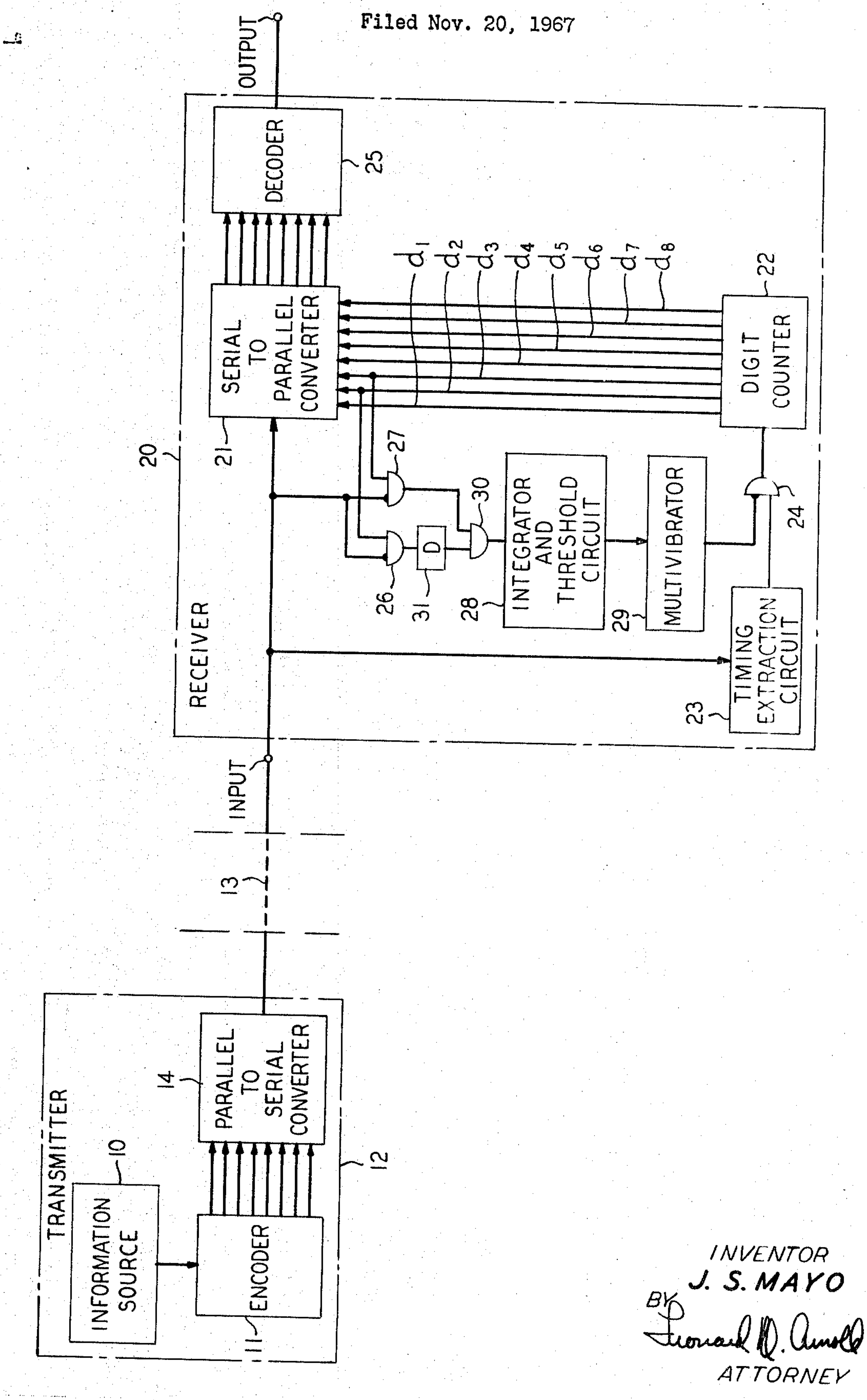
INVENTOR
J. S. MAYO
BY Leonard D. Arnold
ATTORNEY 3,546,592
SYNCHRONIZATION OF CODE SYSTEMS
John S. Mayo, Morristown, N.J., assignor to Bell Telephone Laboratories, Incorporated, Murray Hill and Berkeley Heights, N.J., a corporation of New York
Filed Nov. 20, 1967, Ser. No. 684,245
Int. Cl. H04b *1/16*
U.S. Cl. 325—321 3 Claims

ABSTRACT OF THE DISCLOSURE

Framing of reflected binary code signals into code words is accomplished by monitoring the rate of occurrence of "0's" in both the second and third time slots of each such code word. The probability statistics for certain types of coded signals are such that the probability of receiving "0's" in both the second and third time slots is far less than the probability of receiving "0's" in both of any two other consecutive time slots. When the rate of occurrence of "0's" in a provisionally chosen pair of consecutive time slots exceeds a predetermined value determined by the probability statistics of receiving "0's" in the second and third time slots, the code signals are regrouped in order to accomplish framing until the chosen pair of time slots are the second and third of each code word.

BACKGROUND OF THE INVENTION

In pulse code systems a message wave is converted at a transmitter into groups of sequential pulse signals. Each group constitutes a code word whose number of bits depends upon the code being employed. Once encoding has taken place, recovery of the information contained in the message wave requires that the pulse signals be correctly grouped, i.e., correctly framed, at a receiver. Conventionally, this has been accomplished by accompanying the code words with framing signals. Unfortunately, framing signals cause a consequent reduction in transmission capacity that becomes increasingly significant with code words having a small number of bits per word.

In order to accomplish the framing of pulse signals without reducing channel capacity, statistical framing techniques have been employed. In U.S. Pat. 3,175,157 issued to J. S. Mayo et al., Mar. 23, 1965, framing is accomplished by detecting a divergence between the anticipated and actual properties of a reconstituted code word. The technique there employed relies on the fact that when code signals are out-of-frame, the properties of a message wave reconstituted from those signals differ appreciably from the properties of the message wave as originally transmitted. Hence, an in-frame condition can be achieved by reframing a receiver decoder until the actual and anticipated properties are rendered substantially identical. A message of the known probability amplitude distribution of the input signal is employed in the receiving apparatus and a comparison made by means of a root-square reading between a measure obtained when the signal is in-frame and the signal actually obtained. Upon detection of disparity between these readings, incoming pulse signals are regrouped until the disparity is reduced.

While the apparatus disclosed in U.S. Pat. 3,175,157 operates satisfactorily, it is relatively complex and expensive. Copending application, Ser. No. 272,588 filed on Apr. 12, 1963, now Pat. No. 3,436,480, attempts to simplify the statistical framing apparatus by monitoring the distribution of a characteristic of the code used to represent the message wave rather than the distribution of message wave amplitude and spectral characteristics. In accordance with the invention disclosed in that application, the signals associated with the second and third digits of a reflected binary code word are individually monitored to detect a departure from anticipated probabilities. Specifically, it has been found that the signals associated with the second and third digits of each such code word have higher and lower rates of occurrence of "1's" than the signals associated with the other digits of the code word. The rates of occurrence of "1's" in the second and third time slots are compared and when the rate of occurrence of "1's" in the third time slot exceeds the rate of occurrence in the second time slot, the signals are assumed to be out-of-frame and are regrouped. Specifically, the circuit uses a pair of racing counters: one counts "0's" in the second digit, and the other, "0's" in the third digit of each code word. When the system is in-frame the first counter seldom reaches full count before the second, whereas in out-of-frame conditions either counter can reach full count first with equal probabilities. The circuitry disclosed in that patent application operates satisfactorily with input signals having an amplitude distribution which approximate that of a Gaussian distribution. It does not operate satisfactorily, however, where the signals have a flatter than Gaussian distribution.

It is an object of this invention, therefore, to reduce the cost and complexity of statistical framing apparatus capable of operating with input signals having a flatter than Gaussian amplitude distribution.

SUMMARY OF THE INVENTION

In accordance with this invention, framing of reflected binary code signals is accomplished by monitoring the rate of occurrence of simultaneous "0's" in both the second and third time slots of each code word. When the rate of occurrence of pairs of "0's" in a provisionally chosen pair of consecutive time slots exceeds a predetermined value, the code signals are regrouped until the second and third time slots are located. The predetermined value is determined by the probability statistics which determine that the probability or receiving "0's" in both the second and third time slots of a single word is far less than the probability of receiving "0's" in any two other consecutive time slots.

BRIEF DESCRIPTION OF THE DRAWING

The drawing shows a block diagram of a synchronized reflected binary code system.

DETAILED DESCRIPTION OF THE PREFERRED EMBODIMENT

In pulse code systems a message wave from a source 10 is encoded into reflected or Gray code words by an encoder 11 at a transmitter 12. Conventionally, the output at encoder 11 is in parallel form and these code words are then transmitted in serial fashion over a transmission line 13 by first applying the encoded words to parallel-to-serial converter 14. At the receiving terminal 20, the transmitted signals are applied to a serial-to-parallel converter 21 which functions to convert the incoming serial signals into code words appearing at parallel output terminals. In order to accomplish such conversion which insures that the parallel output signals at converter 21 correspond to the parallel input signals to converter 14, it is necessary that signals be applied to the converter 21 to inform the converter of the occurrence of each time slot of each transmitted code word. To generate such signals, a digit counter 22 is employed and it has a number of output terminals, conventionally designated $d_1$, $d_2$, $d_3$, . . . , equal to the number of bits in each encoded word. For illustrative purposes, assume that each information signal is encoded into an eight-digit word so that counter 22 has eight output terminals, $d_1$ through $d_8$.

The input signal to the digit counter 22 is derived from the output of a timing extraction circuit 23. The timing extraction circuit may be any one of a number of such circuits known in the art. For example, a timing extraction circuit may comprise the tandem connection of a tuned filter, an amplifier, a limiter, a differentiator, and a half-wave rectifier. The filter is tuned to the pulse repetition rate of the transmitted signals and the following amplifier, therefore, generates a signal having a frequency equal to the basic pulse repetition rate. The limiter produces a square wave in response to the output of the amplifier and this signal is differentiated to produce positive and negative going pulses. Half the pulses are eliminated by the half-wave rectifier which produces a pulse during each time slot of the transmission system.

The timing extraction circuit 23 therefore generates an output signal upon the occurrence of each bit of the transmitted signal and this signal is applied to the input terminal of an inhibit gate 24, which, in the absence of an inhibit signal at its inhibit terminal, transmits the output of circuit 23 to the input of circuit 22. Circuit 22 in response to the first such received signal generates an output pulse at its $d_1$ output terminal and ground at all other terminals and in response to the second received signal generates a pulse at its $d_2$ terminal and ground at all other terminals and so on.

Initially, converter 21 produces a parallel output word at its output terminals in response to the reception of the first eight input time slots. Under the assumption that these first received eight time slots constitute a properly framed code word with proper initial start up of the system, the output signal will be properly framed. Assume, however, that the system has not started up properly or that due to transmission errors at some later time the signals are out-of-frame so that the output signals from converter 21 applied to decoder 25 contain bits from different code words. Such an out-of-frame condition, of course, results in an erroneous output signal from decoder 25 and cannot be long tolerated.

In accordance with this invention, proper framing of the incoming signals is assured by monitoring the signals at the second and third output terminals of counter 22. These signals enable inhibit gates 26 and 27, respectively, which have their inhibit terminals connected to receive the input signal. When the input signal is properly framed the occurrence of "0's" in both the second and third time slots of each code word is much smaller than the occurrence of "0's" in any other two consecutive time slots and gates 26 and 27 will not produce an output signal. The probability of occurrence of "0's" in consecutive time slots designated $P_{mn}$ of the Gray code, with Gaussian input and $4\sigma$ loading is listed below.

$$P_{1,2}=2.3\%$$
$$P_{2,3}=0.26\%$$
$$P_{3,4}=38.3\%$$
$$P_{5,6}=P_{6,7}=P_{7,8}=P_{8,9}=P_{9,10}=25\%$$

Should the input signal be out-of-frame then the signals appearing at the $d_2$ and $d_3$ output terminals of counter 22 will be present at a time other than the second and third time slots, respectively, of each code word of the input signal. As a result, more simultaneous "0's" will be received during these time slots than would be received if the signal is properly framed. As a result, gates 26 and 27 are enabled more often in out-of-frame conditions than is the case for in-frame conditions. The output of gate 26 is delayed one time slot by delay circuit 31 and applied to one input terminal of AND gate 30. The output of gate 27 is applied to a second input terminal of AND gate 30 so that when two "0's" are received during the $d_2$ and $d_3$ time slots AND gate 30 will generate an output signal. The output of AND gate 30 is applied to an integrator and threshold circuit 28 which integrates these signals and when the integrated signal exceeds a predetermined threshold level generates an output signal. The output signal is applied to a multivibrator circuit 29 which generates a single output pulse of one time slot duration to inhibit gate 24 and prevents the transmission of one output pulse from circuit 23 to counter 22. As a result, the output signals from counter 22 are "slipped" one time slot with respect to the input signal and the monitoring operation continues in order to ascertain whether the signals now present at the $d_2$ and $d_3$ output terminals of counter 22 correspond to the second and third time slots of the transmitted signal. If they do not, then multivibrator 29 is again triggered, produces an output pulse, and "slips" counter 22 by one time slot. This process continues until the output signals from counter 22 correspond to the bits of each transmitted code word so that the output of converter 21 contains, in parallel form, the bits from a single code word.

Thus, in accordance with this invention, framing of reflected binary code signals is accomplished by monitoring the rate of occurrence of "0's" in both the second and third time slots of code words rather than comparing the rate of occurrences of "1's" in the second time slot with the rate of occurrence of "1's" in the third time slot as was done in the prior art. As a result, the apparatus is able to frame signals having a flatter than Gaussian amplitude distribution while still being relatively inexpensive.

It is to be understood that the above described arrangement is merely illustrative of the principles of operation of the invention. Numerous other arrangements may be devised by those skilled in the art without departing from the spirit and scope of the invention.

What is claimed is:

1. Apparatus for framing reflected binary code signals which comprises, in combination, means for grouping the code signals into individual time slots to form code words, means for monitoring the rates of occurrence of "0's" in both time slots of a selected pair of consecutive time slots of each word, means for detecting a departure of the monitored rates from those anticipated, and means for altering the grouping of said code signals into time slots in response to a detected departure of the anticipated rate from the monitored rate.

2. Apparatus for framing reflected binary code signals which comprises, in combination, a serial-to-parallel converter connected to receive said code signals, a digit counter having an input and a number of output terminals equal to the number of time slots in each code word, means connecting the output terminals of said digit counter to said converter so that said converter operates to group the code signals into individual time slots under the control of said counter to form code words, means for generating a pulse signal during each time slot of said reflected binary code signals connected to the input of said digit counter, means for monitoring the rates of occurrences of "0's" in both the second and third time slots of each code word, means for detecting a departure of the monitored rates from those anticipated, and means for altering the grouping of said code signals into time slots in response to a detected departure of the anticipated rate from the monitored rate by inhibiting an input signal to said digit counter.

3. Apparatus in accordance with claim 2 wherein said means for monitoring said rate of occurrence of the signals in a selected pair of consecutive time slots comprises, in combination, first and second gates each connected to receive input signals and each enabled during a one of said selected consecutive time slots, and a third gate connected to receive the output signals from said first two gates and generate an output signal upon the occurrence of an output signal from said first gate and from said second gate.

References Cited

UNITED STATES PATENTS

| | | | |
|---|---|---|---|
| 3,056,109 | 9/1962 | Loposer | 340—146.1X |
| 3,159,812 | 12/1964 | Engel | 340—146.1 |
| 3,175,157 | 3/1965 | Mayo et al. | 325—321 |
| 3,436,480 | 4/1969 | Pan | 340—146.1X |

ROBERT L. GRIFFIN, Primary Examiner

R. J. BELL, Assistant Examiner

U.S. Cl. X.R.

178—69.5; 325—41; 340—146.1